E. H. VINCENT.
LOCKING STEERING WHEEL.
APPLICATION FILED MAY 31, 1919.
1,335,865.
Patented Apr. 6, 1920.
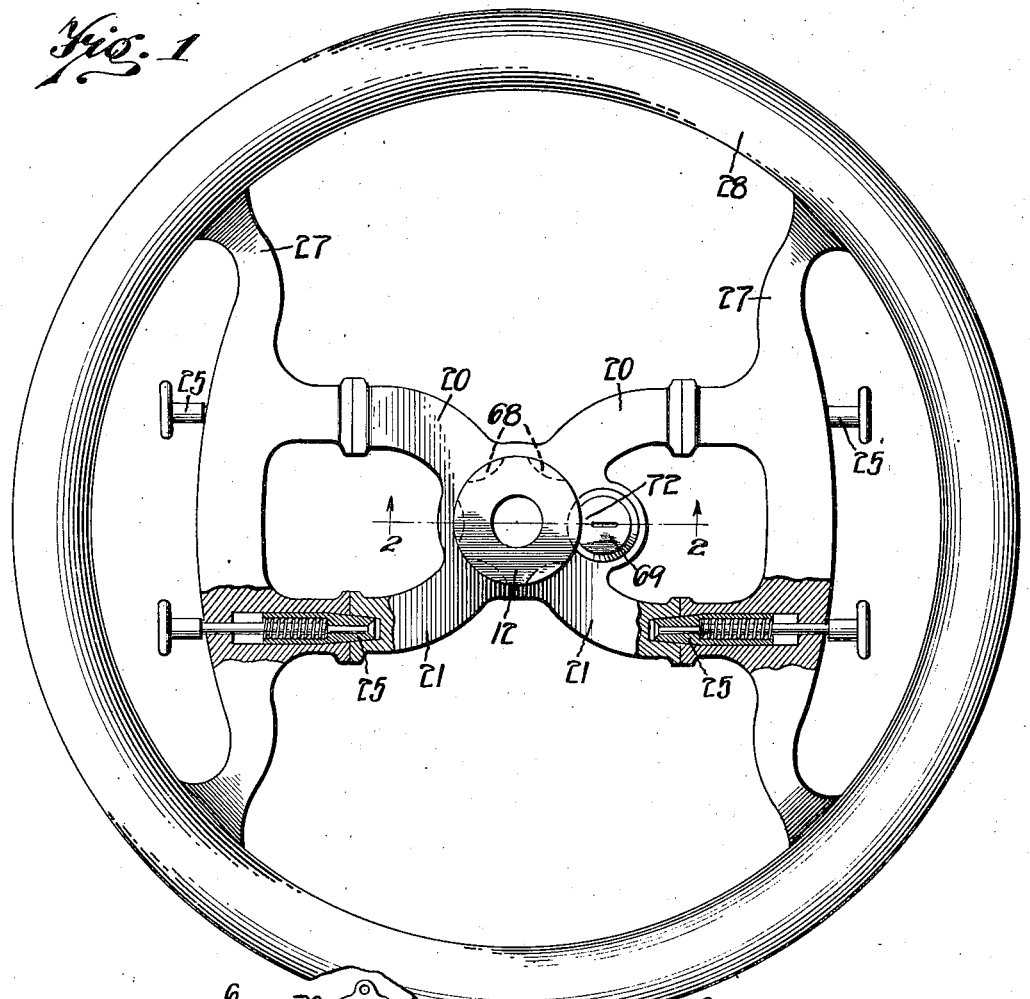
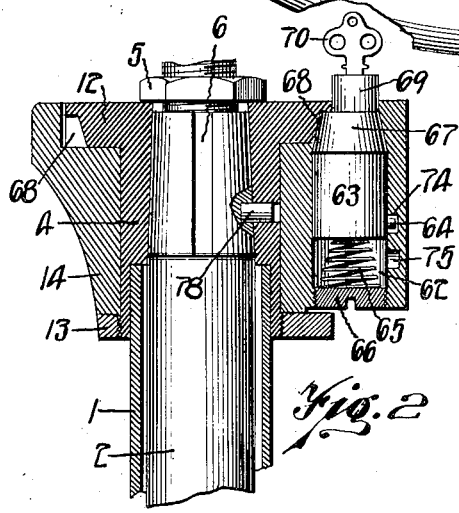
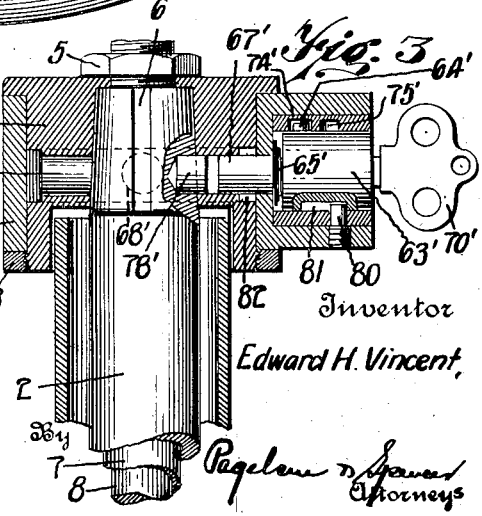
Inventor
Edward H. Vincent,

UNITED STATES PATENT OFFICE.

EDWARD H. VINCENT, OF DETROIT, MICHIGAN.

LOCKING STEERING-WHEEL.

1,335,865.  Specification of Letters Patent.  Patented Apr. 6, 1920.

Original application filed November 25, 1918, Serial No. 263,979. Divided and this application filed May 31, 1919. Serial No. 300,972.

*To all whom it may concern:*

Be it known that I, EDWARD H. VINCENT, a citizen of the United States, and residing at Detroit, in the county of Wayne and State of Michigan, have invented a new and Improved Locking Steering-Wheel, of which the following is a specification.

The present invention has reference to a steering wheel for motor vehicles, more particularly to a construction whereby the rim or wheel structure proper may be locked free from the steering head or shaft at will so as to render it impossible for unauthorized parties to steer the vehicle.

One of the objects of the invention is to provide a construction wherein but few parts are used and wherein these parts are of such nature as to be readily manufactured.

Another object is to provide a more strong, durable and compact device than has been available heretofore. The invention also provides a construction wherein the parts are maintained tight regardless of wear in the lock surface.

Another feature of the invention resides in the use of the lock barrel as the element for transmitting turning force from the rim to the steering shaft or rod. In this manner an unusually strong and at the same time inexpensive construction is secured.

Again, the invention provides a construction wherein the bushing through which torque is transmitted from the wheel proper to the steering shaft or rod is secured to the upper end of said shaft by means which is inaccessible when the wheel is in place. Possession of the key is thereby made essential for the removal of the wheel.

The invention also provides a construction wherein the lock barrel is positively retained in one of two positions, namely, 1st, that in which the wheel is in steering relation to the steering shaft, and, 2nd, that in which it is free to turn about the shaft. Any danger that it might be accidentally left in neutral position instead of the free position desired for locking purposes is thus avoided.

In the drawings, Figure 1 is a plan view, parts being broken away, showing the invention applied to a tiltable wheel, the latter being detached from the column. Fig. 2 is a section on line 2—2 of Fig. 1. Fig. 3 is a similar section showing a modification.

The usual steering column appears at 1, and inclosed therein is the steering shaft or rod 2 upon the conical upper end of which a bushing 4 is adapted to be secured by the nut 5 and key 6. The steering rod, when made hollow as shown, admits the passage of the usual spark and throttle control elements 7 and 8. The bushing has an annular flange 12 at its upper end and is threaded at its lower end to receive a nut 13 whereby a head 14 is secured thereon.

In the embodiment of the invention shown, the head comprises two pairs of arms 20—21, a rim and chord structure 27—28 and two pairs of connecting latches 25 whereby a desirable clearance between the body of the driver and the rim may be secured upon tilting the latter as more fully set forth in the parent application of which this is a division Ser. No. 263,979, dated Nov. 25, 1918. Obviously, the locking functions hereinafter explained apply equally well to steering wheels wherein no provision is made for shifting of the rim for clearance purposes.

In the construction shown in Fig. 2, the rotatable head 14 has a cylindrical socket 62 in which a lock casing or barrel 63 is slidable. The barrel contains any preferred lock mechanism (not shown) whereby the transversely projecting pin 64 may be projected or withdrawn into the barrel at will. A spiral spring 65, positioned between the removable screw 66 and the bottom of the barrel, tends to force the latter upwardly so that the tapered conical upper contact portion 67 with which it is preferably provided normally bears in one of the segmental conical seats 68 formed in the flange 12. By continuing the barrel upwardly as a cylindrical neck 69 into which the key 70 may be inserted, and by machining away a portion of the side of said neck as shown at 72, Fig. 1, it is evident that the barrel is prevented from turning about its own axis when the pin 64 is withdrawn. This pin is adapted to be received in either of two sockets 74—75, when in the position shown, the wheel is locked firmly to the head, the spring 65 maintaining the portion 67 in close engagement with the corresponding seat 68; when the barrel is in its innermost position, that is, when the pin 64 is received in the opening 75, the upper face of the tapered portion 67 of the barrel is below the lower face of the flange 12 and the wheel is free to spin on the head. By thus utilizing the lock barrel itself as a locking member, a much greater area of metal is opposed to shearing than would be the case were the barrel stationary and provided with a projectable plunger or detent.

In the modification, Fig. 3, the seats 68' are cylindrical and extend into the head 14' radially about the axis of the shaft 2, and the neck 67', which corresponds to the neck 67, is cylindrical. The key 70', pin 64', sockets 74' and 75', and the spring 65' correspond, respectively, to the parts 70, 64, 74, 75 and 65 heretofore described. The barrel 63' of the lock is in this instance prevented from angular movement, when the pin 64' is withdrawn, by the threaded pin 80 which projects into the slot 81 formed in said barrel. A pin 78' which is received in one of the seats or sockets 68' secures the bushing to the steering rod.

It will be observed that the pin 67', when withdrawn, rides in a circumferential groove 82 in the bushing 4', and projects somewhat into said groove; therefore it is not possible for a thief to dis-assemble the head 14' from the bushing by unscrewing the nut 13. This, and the fact that the pin 78' is not accessible except after the head 14' is removed, renders the device substantially thief proof.

In both embodiments the pins 64—64' are prevented from being accidentally lodged in neutral position with reference to the sockets 74—75, 74'—75' by the action of the springs 65—65'.

When the wheel is unlocked from the head, the former may be turned angularly about the column to such a position as gives maximum clearance when it is thereafter tilted; consequently it is not necessary to set the vehicle wheels in any particular position with reference to the body in order to allow the driver to readily enter or leave the seat.

It is evident that the details of construction are subject to considerable variation, and I do not, therefore, wish to be limited except as indicated by the subjoined claims.

I claim:—

1. In combination, a steering shaft, a bushing secured thereto, a head rotatable on the bushing, the bushing having a flange overlying the head and formed to receive a lock barrel, and a lock barrel carried by the head and slidable bodily toward and from the flange to lock or unlock the head to or from the bushing at will.

2. In combination, a steering shaft, a bushing secured thereon and having a conical socket, a wheel head mounted to rotate on the bushing, a lock barrel carried by the wheel head and having a tapered end adapted to be received in said socket, and a spring housed in the head and tending to force the lock barrel toward the socket.

3. In combination, a steering shaft, a bushing secured thereon and having a socket adapted to receive a lock barrel, a head mounted to rotate on the bushing, a lock barrel slidable in the head and having a pin projectable therefrom, the bushing having a pair of depressions in either of which said pin may be received, the barrel being held in locking relation to the bushing when the pin is in one depression and being held out of such locking relation when the pin is in the other depression.

4. In mechanism of the class described, a pair of members adapted to have relative angular movement one of the members having a cylindrical outer surface, a lock member slidable longitudinally of said members to lock them against such relative angular movement, said lock member being received in a cylindrical socket in one of the members and being so constructed and arranged as to bear on said cylindrical outer surface, whereby angular movement of the lock member in the socket is prevented.

5. In combination, a steering shaft, a bushing secured thereon and having a socket, a wheel head rotatable on the bushing, a lock barrel carried by the wheel head and having a projection adapted to be received in said socket, and a spring tending to press the lock barrel toward the socket.

6. In combination, a steering shaft, a flanged bushing secured thereto, a head rotatable on the bushing, the flange overlying the head and having a seat formed to receive a lock barrel, and a lock barrel carried by the head and movable into and from the seat to lock or unlock the head to or from the bushing at will.

7. In combination, a steering shaft and a bushing at the upper end thereof provided with a socket, a wheel head rotatable on the bushing, and a lock barrel slidably mounted on the wheel head and having a portion adapted to be received in said socket, the stresses exerted by the wheel head on said bushing being transmitted through said portion of the lock barrel.

8. In combination, a steering shaft and a bushing at the upper end thereof provided with a series of tapering sockets, a wheel head rotatable on the bushing, and a lock barrel slidably mounted on the wheel and having a tapering portion adapted to be received in said sockets, the lock barrel serving as a key whereby stresses may be transmitted from the head to the bushing and steering shaft.

EDWARD H. VINCENT.